US006674490B1

(12) United States Patent
Thiel

(10) Patent No.: US 6,674,490 B1
(45) Date of Patent: Jan. 6, 2004

(54) LIGHT SOURCE FOR A DIGITAL IMAGE PROJECTION SYSTEM

(75) Inventor: Reinhold Thiel, Leutenbach (DE)

(73) Assignee: Eastman Kodak Company, Rochester, NY (US)

( * ) Notice: Subject to any disclaimer, the term of this patent is extended or adjusted under 35 U.S.C. 154(b) by 666 days.

(21) Appl. No.: 09/650,017

(22) Filed: Aug. 28, 2000

(30) Foreign Application Priority Data

Sep. 3, 1999 (DE) .......................................... 199 42 014

(51) Int. Cl.$^7$ ................................................. H04N 5/74
(52) U.S. Cl. ........................ 348/744; 348/777; 348/800; 345/205
(58) Field of Search ................................ 348/744, 759, 348/762, 763, 777, 800, 803; 345/205; 315/169.3

(56) References Cited

U.S. PATENT DOCUMENTS 3,519,880 A * 7/1970 Yoshiyama et al. ........... 345/76
3,564,136 A * 2/1971 Gilmour et al. ............. 348/800
5,489,817 A * 2/1996 Muller et al. ................ 313/495
6,275,270 B1 * 8/2001 Culkin ........................ 348/739

* cited by examiner

Primary Examiner—Michael H. Lee
(74) Attorney, Agent, or Firm—Milton S. Sales

(57) ABSTRACT

A light source for a digital image projection system with a thin-film resonant microchamber comprising a plurality of image-generating light sources. The light images generated from the plurality of light sources are combined and projected onto a projection screen. Each light source comprises a primary electro-luminescent image-generating unit, comprising a layer of electro-luminescent phosphorus and an array of control electrodes for generation of a luminescent image in the phosphorus layer; furthermore an image amplifier with a photocathode adjacent to the electro-luminescent phosphorus layer and generating electrons as a result of light from the primary electro-luminescent image, and an anode for acceleration of the generated electrons by a voltage difference in the direction of the thin-film resonant microchamber.

8 Claims, 3 Drawing Sheets

LIGHT SOURCE FOR A DIGITAL IMAGE PROJECTION SYSTEM

FIELD OF THE INVENTION

The invention relates to a light source for a digital image projection system, comprising a thin-film resonant microchamber with an active phosphorus area arranged between a front and a rear film reflector and an electron source for generation of an image-like structure for stimulation of the phosphorus.

BACKGROUND OF THE INVENTION

Twisted-nematic translucent liquid-crystal light valves with polysilicone electrodes (TN-LCLVs) currently dominate the market for digital projectors. Other basic techniques entail light-reflecting polymer dispersing liquid-crystal light valves (PD-LCLVs), reflecting nematic and other LCLVs. Digital mirror devices (DMDs) and grid-light valves (GLVs) belong to a type of light valves called mechanical-electrical Microsystems (MEMS). As shown in FIG. 2, this type of spatial-light-modulating (SLM) display technology contains a light source 10 having a power supply 12; and a lamp 14 converting the electrical current of the power supply into an unmodulated light beam 16.

The light beam 16 is modulated by an image-generating unit 18 which contains—for example—a two-dimensional spatial light modulator 20 supplied with image information from a digital image source 22. The spatial light-modulated light is then projected onto a screen 24 in an image projection unit 28. What all these SLM techniques have in common is that they passively modulate an incoming light beam in 1 or 2 dimensions for generating an image. This type of image projection unit needs a high-performance and small light source with a highly optimized illumination system in order to divert or attenuate enough light in the intake pupil of a projection lens.

As shown in FIG. 3, an alternative method of spatially modulating light for image projection is to generate active emission elements which can be projected through a lens with appropriate aperture. In digital and video projection systems of this type the image generation 18 is achieved by a special cathode-ray tube (CRT) which has already been developed and is well established in the market for high-performance applications. These special cathode-ray tubes usually comprise an evacuated glass tube containing a single cathode electron source and an array of elements for generation and control of the electron beam 30, an acceleration section 32 and a phosphorus powder anode 34. The image generated on the phosphorus anode 34 is projected onto a screen 24 by a projection lens (not shown). Some brightness limitations inherent to the system exist on account of the material properties of the powder phosphorus used in the anode 34. It is for example not easy to collect the Lambert emissions through a projection lens, since the maximum energy density load on the powder anode is limited by the thermal conduction. The individual cathode source 30 also limits the beam current and hence the maximum energy density load on the anode 34.

U.S. Pat. No. 5,469,018 discloses a resonant microchamber display element of high efficiency and high-aligned output. In a design suitable for projection screen television, the resonant microchamber display element is contained in the face plate of a cathode-ray tube (CRT). In this way the anode 34 in FIG. 3 is replaced by a resonant microchamber anode. There are a number of drawbacks in the use of RMCs in a CRT. Cathode luminescence through a cathode-ray tube, although representing a conventional method for image generation, does not lead to a flat, thin display device. Conventional projection CRT cathodes are limited in their output (current load) and service life. For applications with high light output, the image control electronics must also be configured for high performance and is more expensive.

U.S. Pat. No. 5,543,862 discloses a video display system for use in applications for direct viewing. The system has a flat panel image amplifier onto which a video image is transmitted, for example from an electro-luminescent panel in contact with the image amplifier panel. The image amplifier contains a layer of photocathode material for converting photons from the optical display into electrons, which are accelerated in a flat vacuum chamber and impact on a fluorescent layer, where they generate a light image. A crucial drawback of this arrangement for use in a projection display is that the light emission from the image amplifier is heavily diffused, entailing the use of larger optical focusing equipment. A further drawback is the relatively low efficiency of the system.

SUMMARY OF THE INVENTION

The object underlying the present invention is therefore to provide an improved image-generating light source and a projection display system that avoids the drawbacks of the prior art.

In accordance with a design example, the invention relates to a digital image projection system with a resonant microchamber display device comprising a plurality of image-generating light sources. The light images generated from the plurality of light sources are combined and projected onto a projection screen. Each light source comprises: a primary electro-luminescent image-generating unit, comprising a layer of electro-luminescent phosphorus and an array of control electrodes for generation of a luminescent image in the phosphorus layer; an image amplifier with a photocathode adjacent to the electro-luminescent phosphorus layer and generating electrons as a result of light from the primary electro-luminescent image, in order to emit a light image of high intensity, with the light image having a band width in the magnitude of 5 nm and an angle emission profile in the magnitude of 20°.

The digital image projection system in accordance with the invention has the advantages of a higher system efficiency thanks to lower emission angles and low power input of the image-generating light source. The system in accordance with the invention has the capability of generating a better image quality and higher contrast than conventional projection systems, and the image definition is not dependent on the brightness, as is the case in conventional CRT projection systems. The system also has the capability to generate a higher color saturation thanks to very narrow spectral emission of the red, green and blue color channels, it can be constructed smaller and lighter, and it generates less noise than conventional systems thanks to the use of smaller cooling systems and lower current.

The image-generating light source used in the projection system in accordance with the invention has the advantage that the photocathode is a dependable and long-lived electron source for the resonant microchamber anode. With close alignment the photocathode is a flat and thin electron source for the resonant microchamber anode. Since the image information is inserted early in the image-generating process (before the electro-optical amplification), the image control electronics can manage with lower current (lower control voltage and current) and can therefore be less expensive. The use of a photocathode in the image-generating light source permits the use of a non-pixellated monochromatic anode, for which reason an intermediate step for alignment is not necessary. The color image is generated by the combination of images generated by red, green and blue emitting light sources.

BRIEF DESCRIPTION OF THE DRAWINGS

The invention is explained in detail in the following on the basis of the design examples and the drawing.

In the drawings.

DETAILED DESCRIPTION OF THE INVENTION

Figure 4:
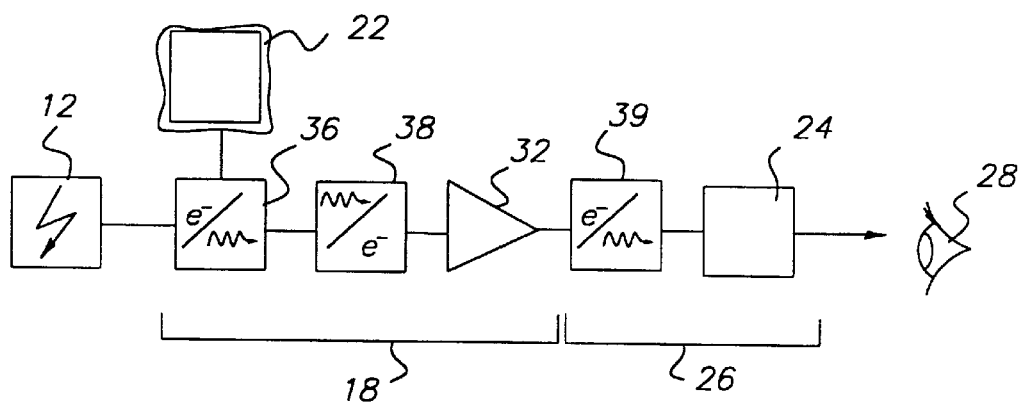
FIG. 4 is a schematic block diagram showing the image generation by active spatial light modulators by means of amplification in the manner in accordance with the invention.

To permit easier comprehension, the same reference numbers were used for identical components in the different figures wherever possible. In FIG. 4, the image-generating process used in accordance with the invention is shown. In a first unit 36 a light image is generated by an electro-luminescent flat panel display. Then the light image is converted by a photocathode 38 into electrons and the electrons are accelerated by an acceleration voltage 32. The accelerated electrons are then converted by a resonant microchamber anode 39 into an extremely aligned high-intensity light image. The light image is then focused by optical elements (not shown) onto a screen 24 where it can be seen by a beholder 28.

Figure 1:
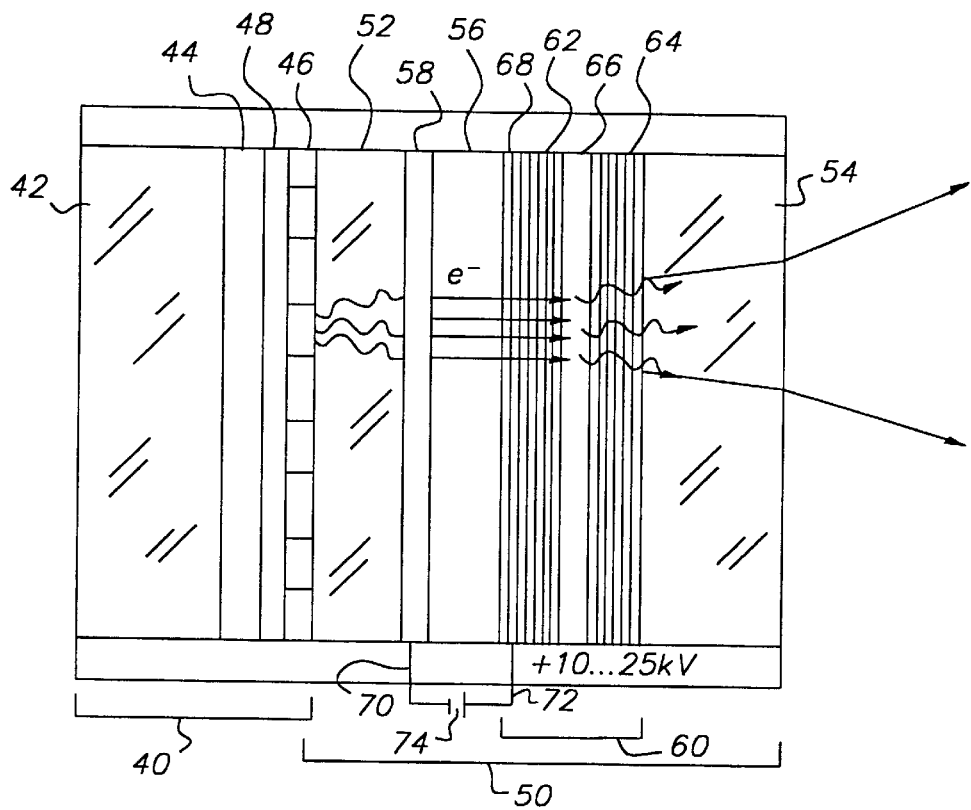
FIG. 1 is a schematic diagram showing a resonant microchamber emission face plate used in a digital image projection system of a design in accordance with the invention.
Figure 2:
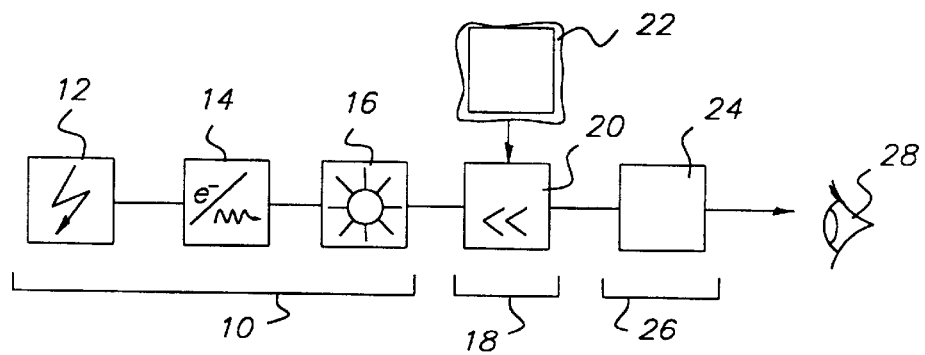
FIG. 2 is a schematic block diagram showing the image generation by passive spatial light modulators as known in the prior art.
Figure 3:
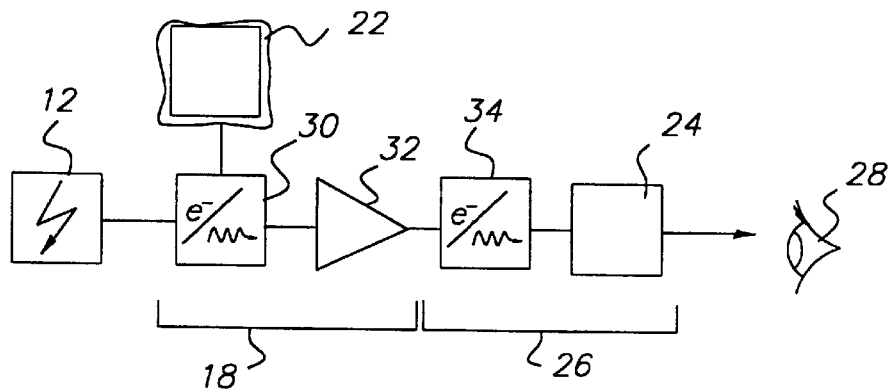
FIG. 3 is a schematic block diagram showing the image generation by active spatial light modulators as known in the prior art.

FIG. 1 shows the structure of an image-generating light source in accordance with the invention with flat panel resonant microchamber. The light source has an electro-luminescent screen 40 mounted on a base layer 42. The electro-luminescent screen contains column and row controlling electrodes 44 and 46 respectively, and a layer of electro-luminescent phosphorus 48 arranged as an intermediate layer between the control electrodes. An example for an electro-luminescent screen 40 of this type can be seen in U.S. Pat. No. 5,543,862.

Directly adjacent to the electro-luminescent screen 40 is a resonant microchamber image amplifier 50. The resonant microchamber image amplifier 50 has a rear and a front transparent face plate 52 and 54 respectively, which are slightly apart and hence create a vacuum chamber 56 in between. The rear face plate 52 is relatively thin and does not have to bear any mechanical forces from the vacuum since it can be mounted directly on the electro-luminescent image panel, with the base layer 42 of the image panel taking up the mechanical forces resulting from the external air pressure. A photocathode 58 is arranged on the inner side of the face plate 52. A resonant microchamber 60 formed by a rear mirror 62 and a front mirror 64 is arranged on the inside of the face plate 54. The front and rear mirrors are thin-film Bragg layers structured as described in U.S. Pat. No. 5,469,018. Cathode-luminescent phosphorus 66 is arranged between the front and rear mirrors 62 and 64 of the resonant microchamber 60. The cathode-luminescent phosphorus can have, for example ZnS, Y2O3:R, Y2O2S:r, La2O2S:R (where R is an activator or doping agent for generating emissions in the primary colors, e.g. for generating red, green or blue emissions, R=Eu, Tb, Tm). An anode 68 (e.g. 50 nm thick aluminum) is arranged on the rear face of the rear mirror 62. The aluminum anode can be provided on the rear mirror, for example by vapor deposition. The electrodes 70 and 72 make the electrical contact with the photocathode 58 and anode 68 and lead out of the vacuum chamber in order to provide an electrical connection to a high-voltage power supply 74 (e.g. between 10 and 25 kV).

In the application, a digital image signal is applied to the column and line control electrodes in the manner of an image grid, in order to make the electro-luminescent phosphorus 48 emit an image-like pattern of photons (light). The photons penetrate the rear face of the face plate 52 and have the effect together with the photocathode 58 that electrons are emitted from the photocathode. The electrons are accelerated in the direction of the anode through the electrical field created by the high-voltage power supply 74. Thanks to the flatness of the photocathode surface and the uniformity of the acceleration potential, the diameter of the electron beam (which corresponds to a single pixel) is rather constant and does not expand over the acceleration section.

At the anode 68 the electrons have certain interactions with the aluminum layer and the rear of the mirror 62. The main absorption of electrons takes place in the phosphorus inside the resonant microchamber 60. Thanks to the natural properties and special design parameters of the resonant microchamber, the spontaneous emission properties of the phosphorus are changed in two ways. The resultant electro-magnetic emission has a low bandwidth (in the magnitude of 5 nm) and an emission profile with a low angle (in the magnitude of 20°).

Figure 5:
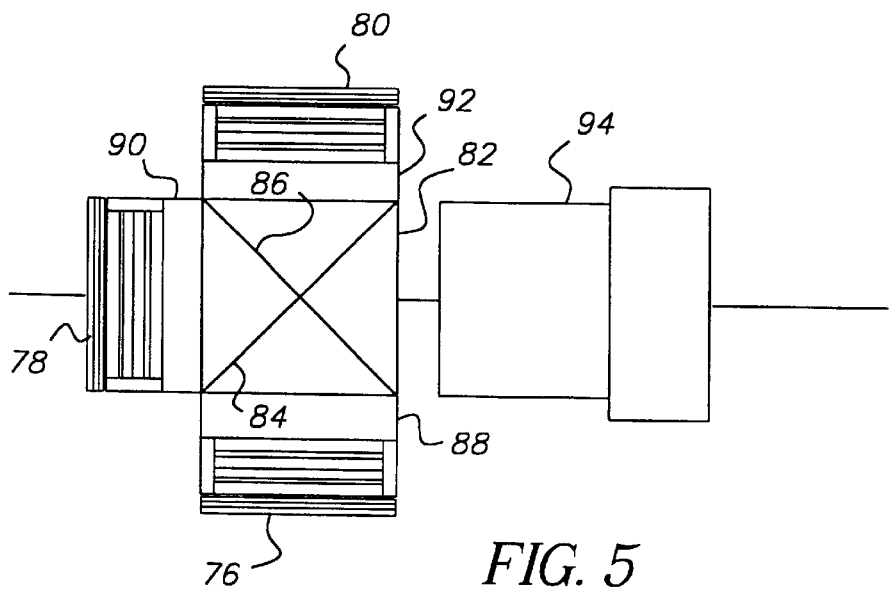
FIG. 5 is a schematic plan view of a version in accordance with the invention of a digital image projection system.

In FIG. 5 a color projection system is shown that uses image-generating light sources in accordance with the present invention. The projector contains three image-generating light sources 76, 78 and 80, which are designed such that they generate a red, green and blue image respectively. The red-emitting image-generating light source 76 contains a resonance chamber with a plurality of Bragg mirrors 62 and 64 and cathode-luminescent phosphorus 66 of Y2O3:Eu. The green-emitting image-generating light source 78 contains a resonance chamber with a plurality of Bragg mirrors 62 and 64 and cathode-luminescent phosphorus 66 of Y2O3:Tb. The blue-emitting image-generating light source 80 contains a resonance chamber with a plurality of Bragg mirrors 62 and 64 and cathode-luminescent phosphorus 66 of Y2O3:Tm. digital image signals representing red, green and blue components of an image are supplied to the image-generating light sources 76, 78 and 80 respectively.

The images emitted from the three light sources 76, 78 and 80 are combined in an X-shaped dichroic filter 82 which is provided with a first dichroic mirror 84 letting through green and blue-colored light and reflecting red-colored light, and a second dichroic mirror 86 letting through green and red-colored light and reflecting blue-colored light. Cooling systems 88, 90 and 92 are arranged between the X-shaped dichroic filter 82 and the image-generating light sources 76 or 78 and 80. The cooling systems contain for example a glycol-filled chamber connected directly to the light source face plate. The combined color image coming from the X-shaped dichroic filter 82 is focused by a projection lens 94 onto a screen (not shown).

In a preferred design example of the device in accordance with the invention, the three image-generating light sources have a side ratio of 51 mm by 39 mm and a resolution of 1024 by 768 pixels, and generate in each case an identically-colored light flux of 1000 Lumen.

Figure 6:
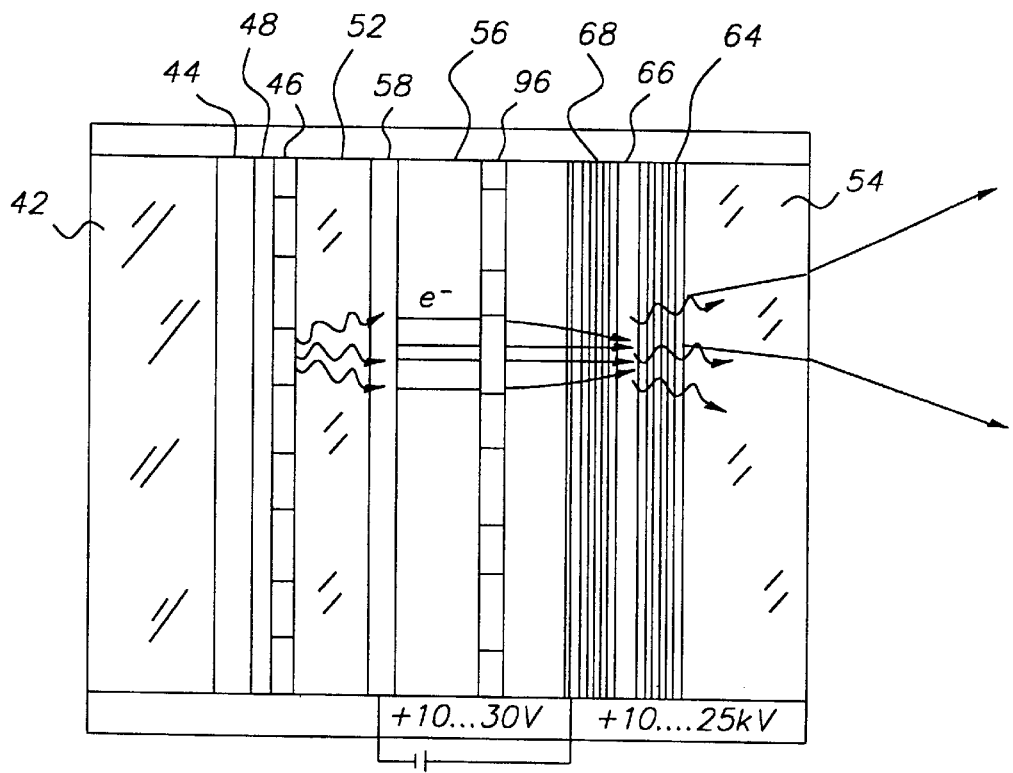
FIG. 6 is a schematic diagram showing a resonant microchamber emission face plate used with a self-focusing grid of an alternative design in accordance with the invention.

FIG. 6 shows an alternative design example of the image-generating light source of the device in accordance with the invention. The light source is in principle the same as that in FIG. 1, but with an additional self-focusing grid 96 that is arranged in the vacuum chamber 56 between the photocathode 58 and the aluminum anode 68. The self-focusing grid 96 is for example a thin sheet of non-conducting material such as glass or ceramics, provided with holes 98, said holes being aligned with the pixels on the electro-luminescent screen 40 while the sheet is coated on one or both sides with a conductor such as aluminum. The holes 98 are created by, for example, phototechnical processes or by laser drilling methods.

PARTS LIST

10 light source
12 power supply
14 lamp
16 light beam
18 image-generating unit
20 two-dimensional spatial light modulator
22 digital image source
24 projection screen
26 projection unit
28 beholder
30 electron beam
32 acceleration section
34 phosphorus powder anode
36 first unit
38 photocathode
39 resonant microchamber anode
40 electro-luminescent screen
42 base layer
44 row controlling electrode
46 line controlling electrode
48 electro-luminescent phosphorus
50 resonant microchamber image amplifier
52 rear of transparent face plate
54 front of transparent face plate
56 vacuum chamber
58 photocathode
60 resonant microchamber
62 rear mirror
64 front mirror
66 cathode-luminescent phosphorus
68 anode
70 electrode
72 electrode
74 high-voltage power supply
76 a light source generating a red image
78 a light source generating a green image
80 a light source generating a blue image
82 X-shaped dichroic filter
84 first dichroic mirror
86 second dichroic mirror
88 cooling system
90 cooling system
92 cooling system
94 projection lens
96 self-focusing grid
98 holes

What is claimed is:

1. A light source for a digital image projection system, comprising a thin-film resonant microchamber with an active phosphorus area arranged between a front and a rear film reflector and an electron source for generation of an image-like structure for stimulation of the phosphorus, the electron source comprises a primary electro-luminescent image-generating unit having a layer of electro-luminescent phosphorus and an array of control electrodes for generation of a front luminescent image in the electro-luminescent phosphorus layer; and an image amplifier with a photocathode arranged adjacent to the electro-luminescent phosphorus layer for the generation of electrons as a result of light from the primary electro-luminescent image and an anode for acceleration of the generated electrons by a voltage difference in the direction of the thin-film resonant microchamber.

2. A light source for a digital image projection system according to claim 1, wherein a self-focusing grid is arranged between the photocathode and the anode.

3. A light source for a digital image projection system according to claim 1, wherein the anode comprises an aluminum layer.

4. A light source for a digital image projection system according to claim 1, wherein the electro-luminescent phosphorus comprises TFEL monochromatic ac powder.

5. A light source for a digital image projection system according to claim 1, wherein the cathode-luminescent phosphorus comprises La2O2S:R, where R stands for EU, Th or Tm for generating red, green or blue emissions.

6. A digital image projection system with a plurality of image-generating light sources comprising a thin-film resonant microchamber with an active phosphorus area arranged between a front and a rear film reflector and an electron source for generation of an image-like structure for stimulation of the phosphorus, active phosphorus area arranged between a front and a rear film reflector and an electron source for generation of an image-like structure for stimulation of the phosphorus, the electron source comprises a primary electro-luminescent image-generating unit having a layer of electro-luminescent phosphorus and an array of control electrodes for generation of a front luminescent image in the electro-luminescent phosphorus layer; and an image amplifier with a photocathode arranged adjacent to the electro-luminescent phosphorus layer for the generation of electrons as a result of light from the primary electro-luminescent image, and an anode for acceleration of the generated electrons by a voltage difference in the direction of the thin-film resonant microchamber.

7. A digital image projection system according to claim 6, wherein cooling means are arranged between the light source and the image combination unit.

8. A digital image projection system according to claim 6, wherein the image combination unit comprises an X-shaped dichroic filter.

* * * * *

UNITED STATES PATENT AND TRADEMARK OFFICE
CERTIFICATE OF CORRECTION

PATENT NO. : 6,674,490 B1  Page 1 of 1
DATED : January 6, 2004
INVENTOR(S) : Reinhold Thiel It is certified that error appears in the above-identified patent and that said Letters Patent is hereby corrected as shown below:

<u>Column 6,</u>
Line 38, please replace the text "Th or Tm" with -- Tb or Tm --

Signed and Sealed this

First Day of June, 2004

JON W. DUDAS
*Acting Director of the United States Patent and Trademark Office*